LOUIS VOIDA
RALPH W. KELL
WARREN R. HOELZEN
CHARLES R. HAMILTON
*INVENTORS*

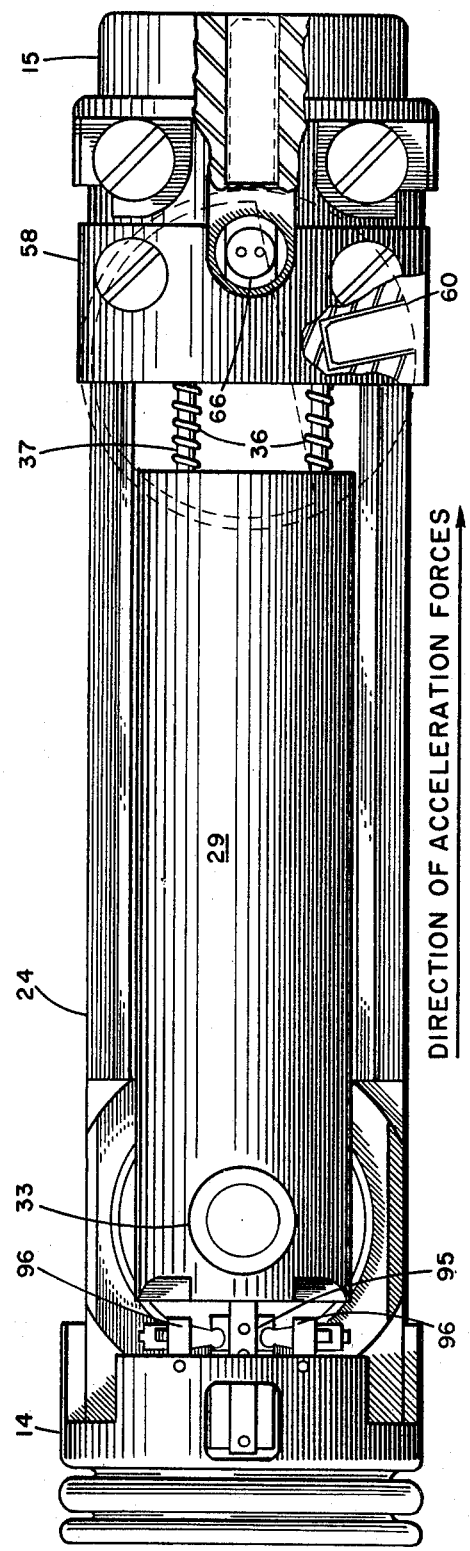
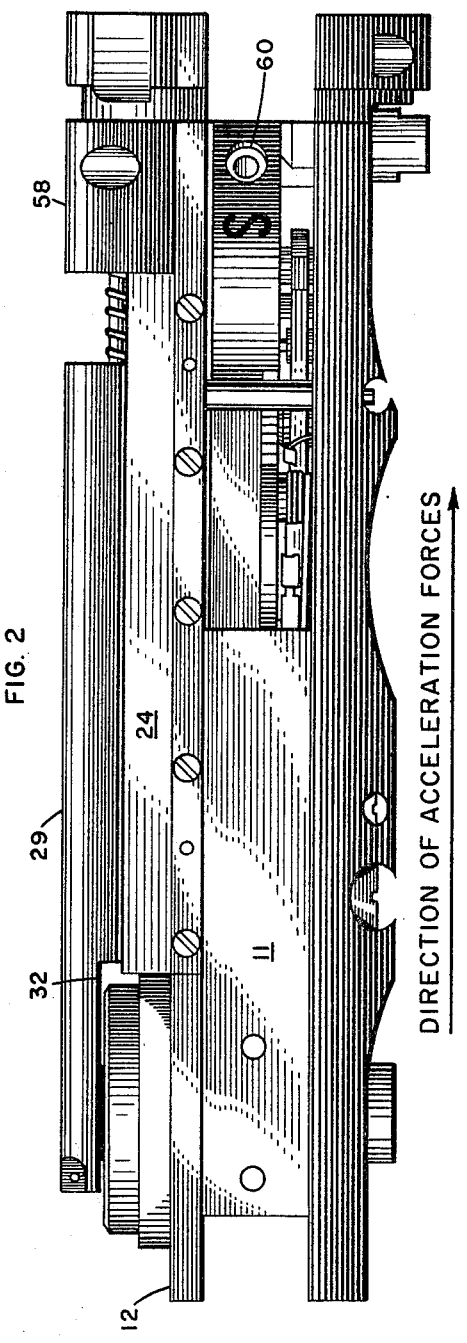

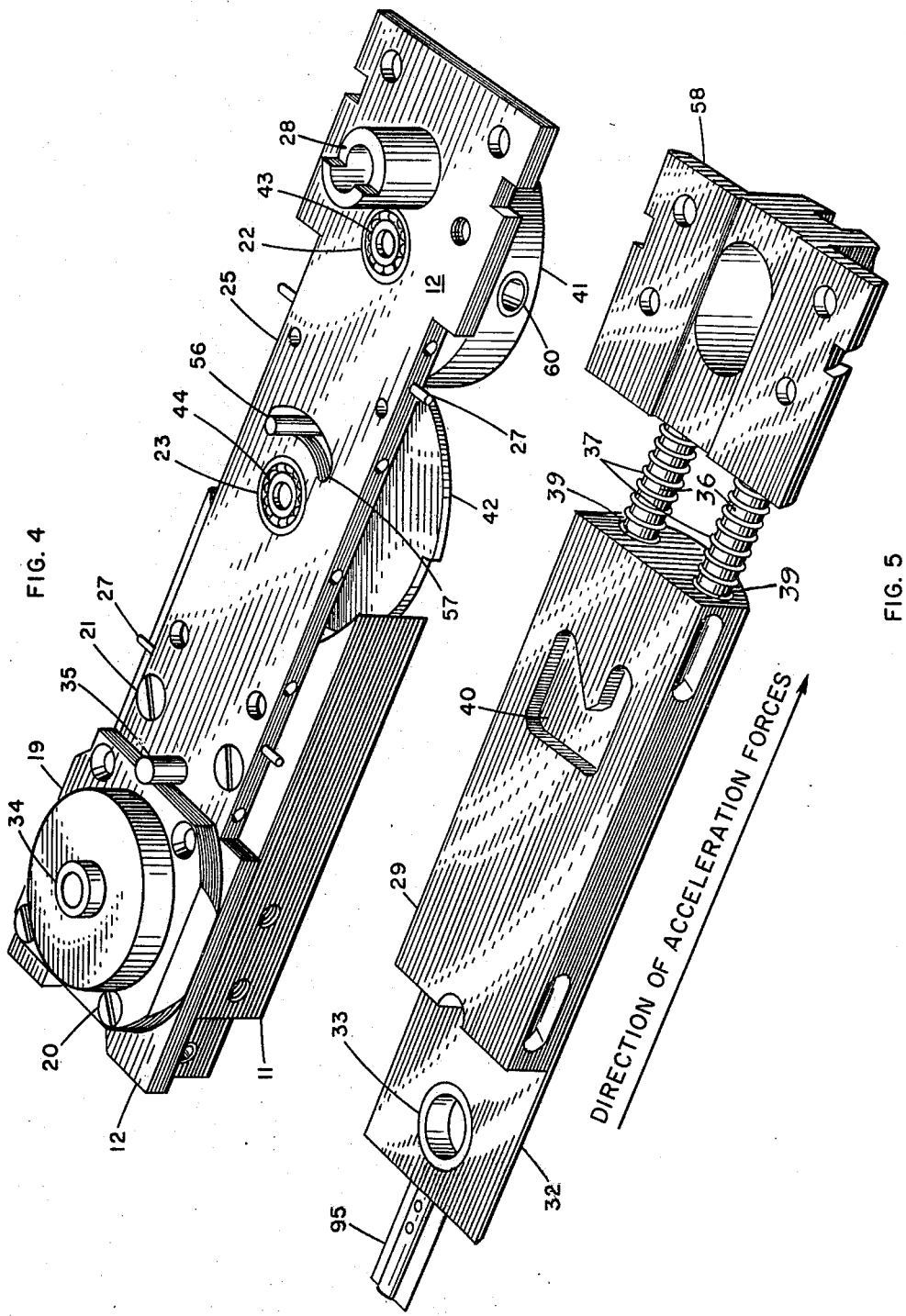

March 3, 1970 L. VOIDA ET AL 3,498,225
COUNTER-ROTATING DUAL ROTOR SAFETY AND ARMING MECHANISM
Filed Oct. 7, 1958 13 Sheets-Sheet 4

DIRECTION OF ACCELERATION FORCES →

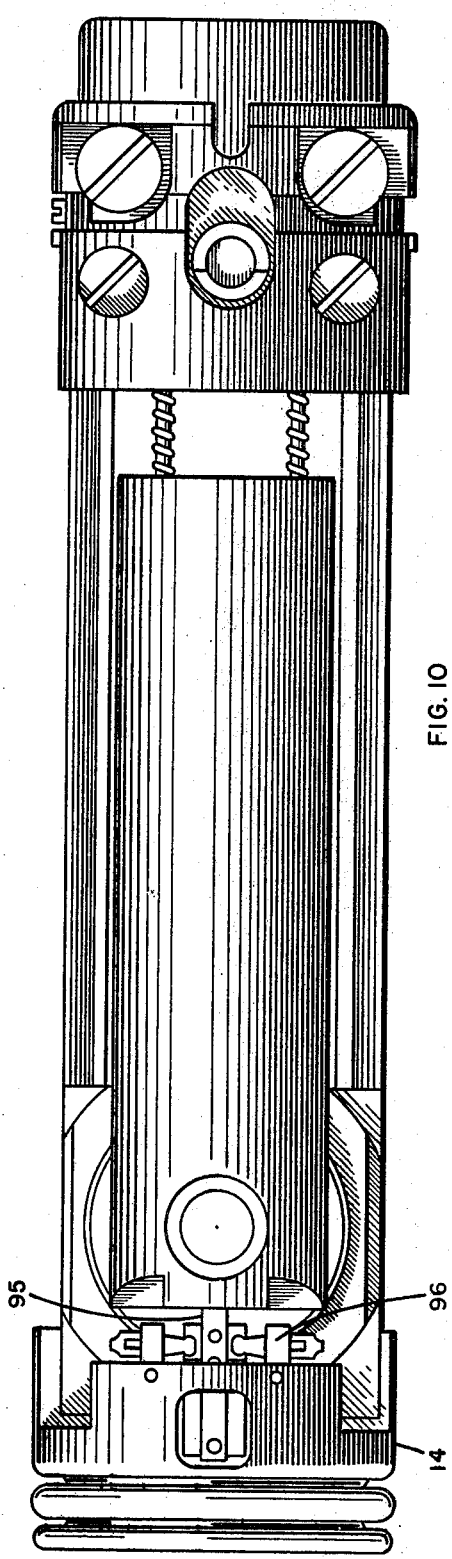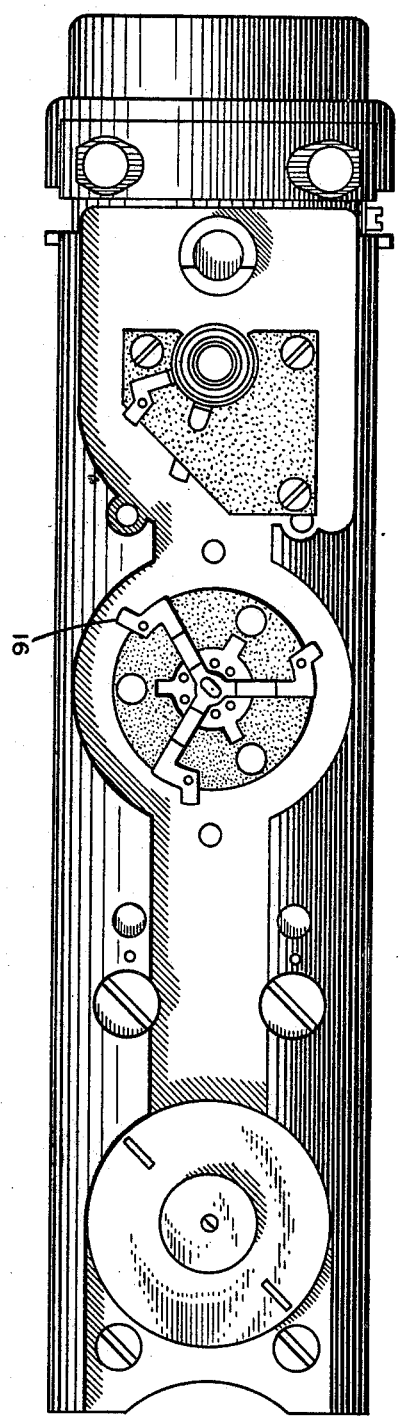

DIRECTION OF ROTATION

DIRECTION OF ACCELERATION FORCES

DIRECTION OF ROTATION

DIRECTION OF ACCELERATION FORCES
———————————————→

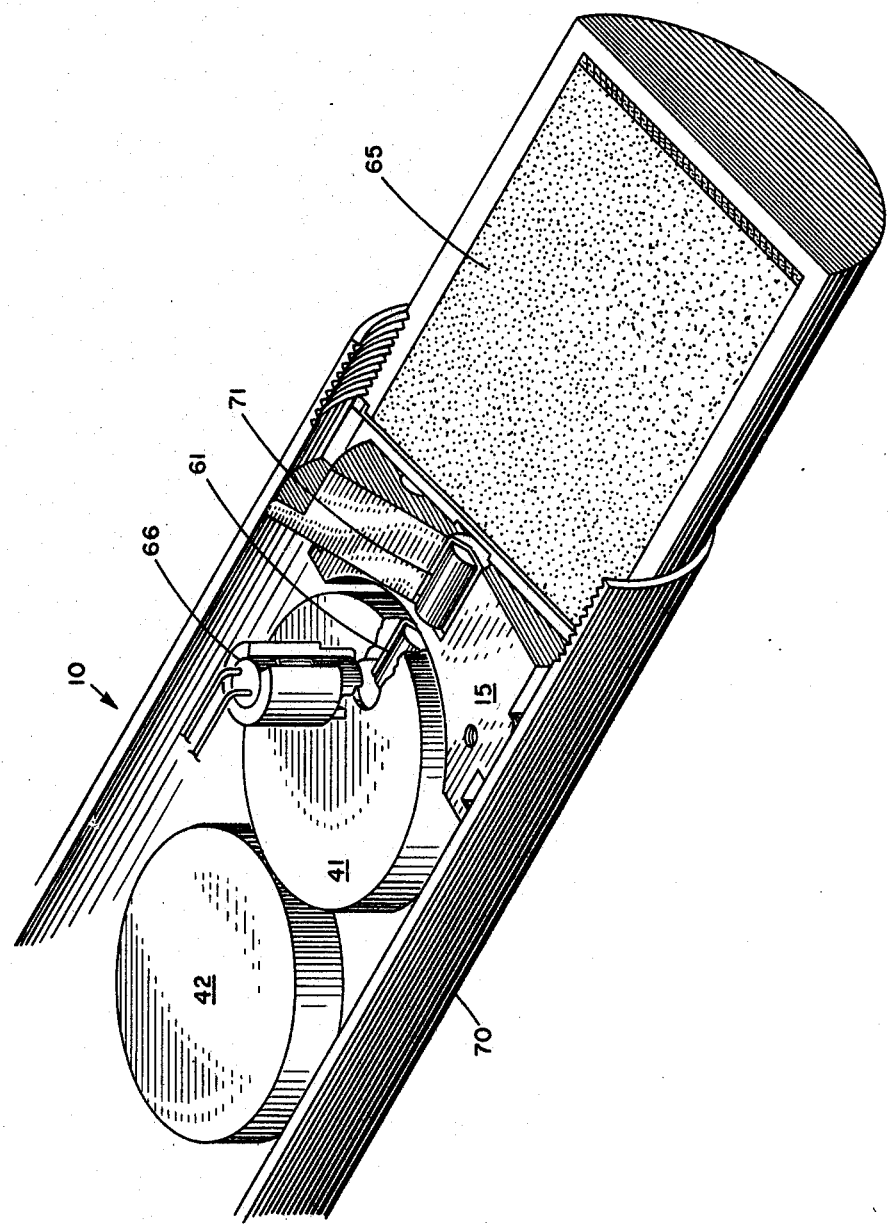

United States Patent Office 3,498,225
Patented Mar. 3, 1970

3,498,225
COUNTER-ROTATING DUAL ROTOR SAFETY
AND ARMING MECHANISM
Louis Voida, Canoga Park, Calif., Ralph W. Kell, Lincoln, Nebr., and Warren R. Hoelzen and Charles R. Hamilton, Corona, Calif., assignors, by direct and mesne assignments, to the United States of America as represented by the Secretary of the Navy
Filed Oct. 7, 1958, Ser. No. 772,152
Int. Cl. F42c 15/06
U.S. Cl. 102—70.2                                      5 Claims This invention relates to safety and arming devices, such as those used with electrically operated fuzes of a missile and more particularly to a novel inertia operated safety and arming device incorporating the concept of counter-rotating weights to nullify erroneous influence of lateral acceleration forces as disclosed in the patent application of Wayne E. Phillips, Ser. No. 582,607 filed May 3, 1956 and entitled "Fuze Safety and Arming Device Employing Counter-Rotating Weights to Nullify Erroneous Influence of Lateral Accelerations," and now abandoned.

The prior safety and arming devices used in fuzes of this nature normally employed either a single rotating weight or sliding weight under the control of a spring or clock mechanism as an integrating device to measure the distance to arming. Other devices employed were either pressure actuated mechanism dependent upon rocket motor gas pressure to initiate the arming cycle or separate electronic-mechanical switching assemblies including a large number of moving parts. The disadvantage of the single rotating or sliding weight devices is that they operate satisfactorily only if the missile flies a substantially straight course after launching to the arming positions. If the missile steers prior to arming, large lateral accelerations occur normal to the line of flight and introduce an error in measurement of distance to arming. In the case of a single rotating weight device the error results from the fact that the torque developed by the single rotating weight is not purely a function of acceleration parallel to the line of flight but is a function of the resultant of both the acceleration parallel to the line of flight and lateral acceleration normal to the line of flight. While in the case of a sliding weight the error introduced by lateral accelerations results from an increase in sliding friction between the weight and its guide. Also the retarding action of the spring or clock escapement mechanism will further increase the relative error of either the single rotating or sliding weight mentioned above.

The pressure actuated devices depending upon rocket motor gas pressure are extremely temperature sensitive and a variation in temperature of the rocket motor gases will vary the reaction time of the device. Also the gas has to be bled into the device through an orifice which becomes easily fouled by motor gas particles and soon fails to meter the gas properly.

The disadvantages of some of the electro-mechanical devices are, of course, obvious since the larger the number of separate moving parts in any device, the greater the possibility of a mechanical malfunction either with respect to the interlocking mechanical linkages or to the terminal connections of the respective electrical components.

The present invention in its broadest concept consists essentially of the combination of a sliding weight reacting to setback due to acceleration along the line of flight, a cam slot in said weight, a pair of geared together counter-rotating eccentrically weighted rotors which react only to acceleration along the line of flight, a pin on one of said rotors and adapted to ride in said cam slot, a detonator carried in said other rotor and an escapement mechanism associated with the rotors and metering the power from the rotors at an integrating rate corresponding to the acceleration forces to which the missile is subjected. Prior to launching of the missile the rotors are held in the safe position by the engagement of the pin on the rotor with the cam slot in the sliding weight and the sliding weight is locked by a pin on a locking solenoid. In this position the detonator is out of line with the explosive train. Before the missile is launched and the arming cycle is commenced, the locking solenoid is actuated withdrawing the pin which locks the sliding weight whereby upon launching the sliding weight moves aft, due to setback, to the commit acceleration point. The relationship of the pin on the rotor with the cam slot at this point is such that the eccentrically weighted rotors are now free to rotate and are subject to axial acceleration forces. The rotors rotate at a velocity allowed by the escapement mechanism until the missile reaches a set integrated distance. After the integrated distance has been reached the rotors are no longer under the control of the escapement mechanism and rotate freely to the armed position. The detonator is now in line with the explosive train completing the arming cycle.

The principal object of the invention is the provision of a new and improved safety and arming device for a missile incorporating the concept of eccentrically weighted counter-rotating rotors to substantially nullify the influence of lateral acceleration forces due to steering of the missile during its arming cycle.

A further object is to provide a device for positively maintaining a detonator out of the explosion train until the missile containing the device is launched and the device is acted upon by setback.

A further object of the invention is to provide a safety and arming device having a rotatable arming member arranged therein including means responsive to axial acceleration forces secured thereto for rotating the arming member to an armed position and having means for firing the explosive charge within the arming member which is effective after the arming member has been rotated to an armed position.

A further object of this invention is to provide a device of the character described which cannot be accidentally armed by dropping or jolting and which operates only after actuation by a sustained force or setback.

Other objects and many of the attendant advantages of this invention will be readily appreciated as the same becomes better understood by reference to the following detailed description when considered in connection with the accompanying drawings wherein:

FIG. 2 is a top plan view of the device showing the aft rotor in dotted lines with cutaway portions exposing the detonator and the short lead in the lead block;

FIG. 3 is a side elevation of the left side of the device with the bottom plate and header block removed;

FIG. 4 is a top perspective view of the device with the sliding weight, stop block and bottom plate removed;

FIG. 5 is a bottom perspective view of the sliding weight and stop block;

FIG. 10 is a top plan view of the complete device;

FIG. 11 is a bottom plan view of the device without the header block;

FIG. 15 is a perspective cut away view of the rotors and the explosive train;

Figure 1:
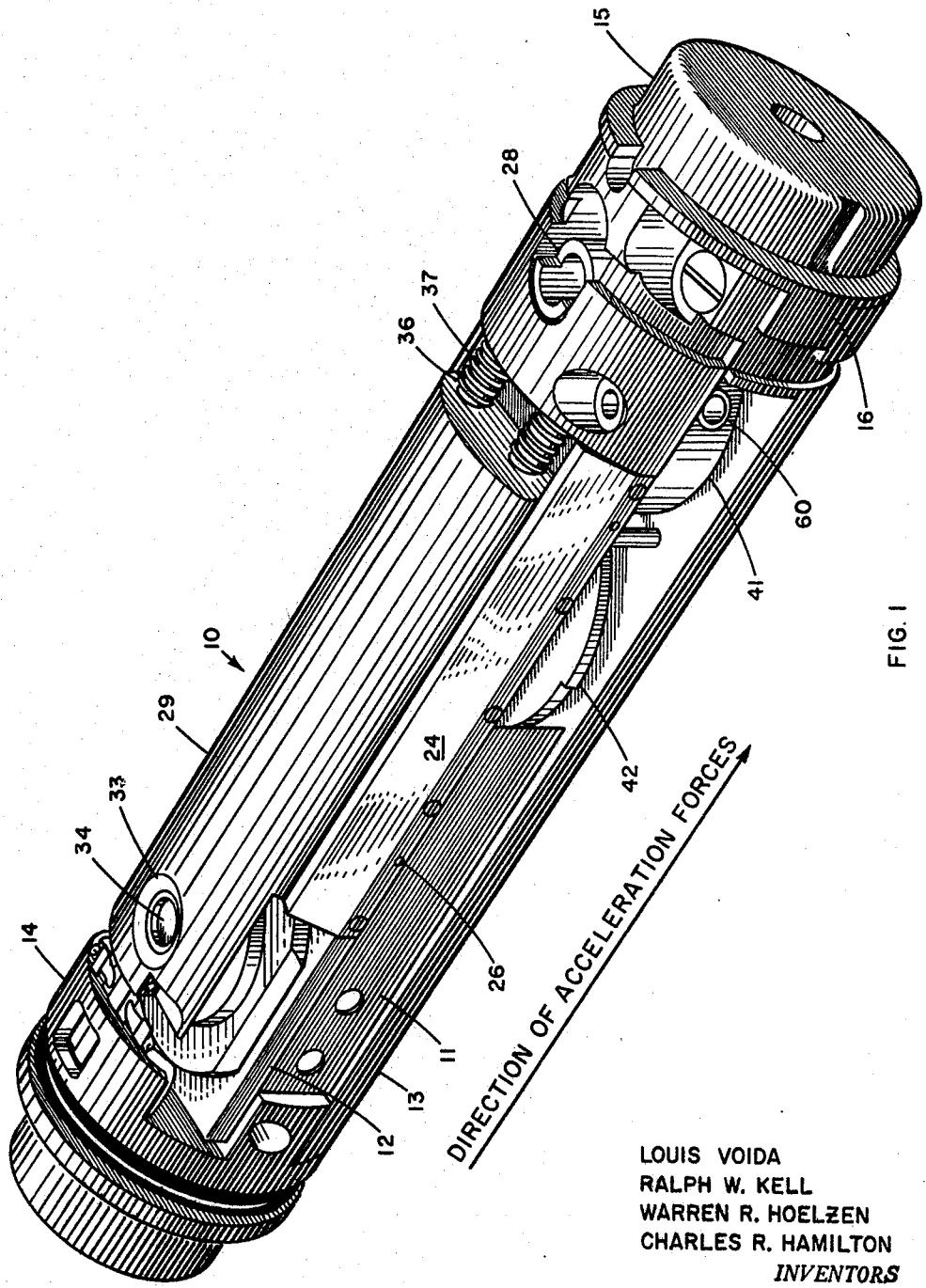
FIG. 1 is a perspective view of the complete safety and arming device.
Figure 6:
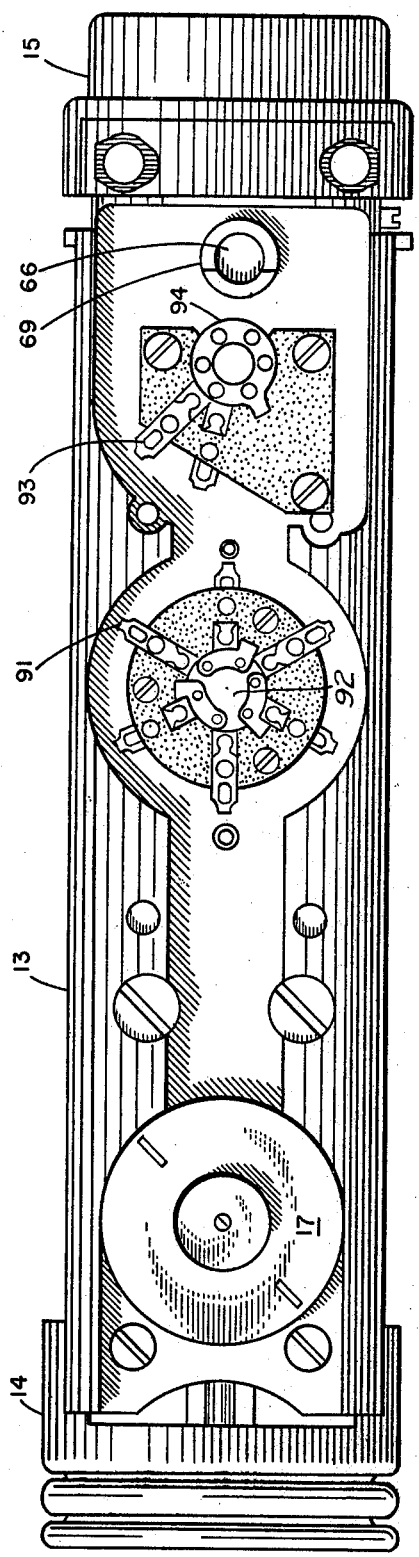
FIG. 6 is a bottom plan view of the complete device.

Referring to the drawings in detail for a more complete understanding of the invention the safety and arming device 10 comprises a main body element or escape block 11, a top plate 12 and a bottom plate 13. A header block 14 is adapted to accommodate the forward end of the top plate, escape block and bottom plate in their assembled condition and a lead block 15 is mounted on the aft end of the completed assembly with a curved portion 16 projecting between the top plate 12 and the bottom plate 13.

Figure 7:
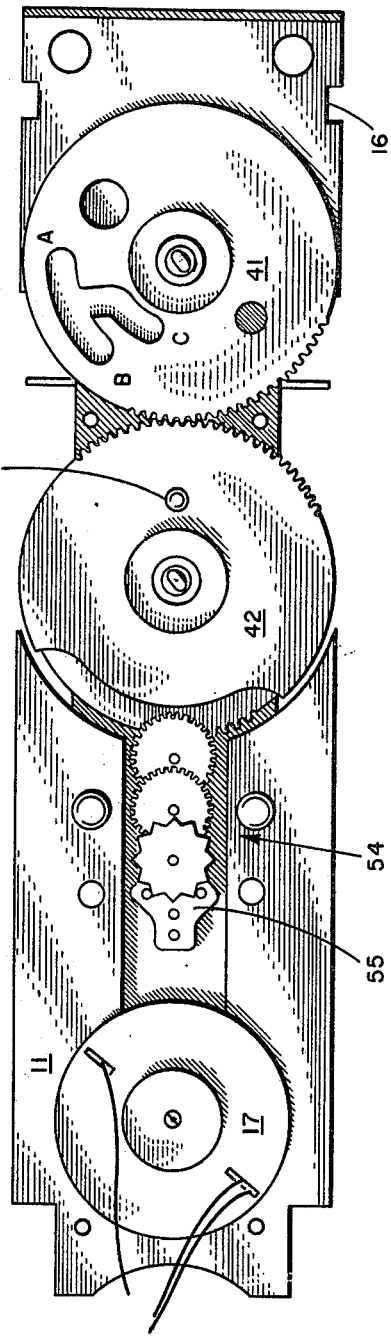
FIG. 7 is a bottom plan view of the device with the bottom plate removed exposing the rotors and escapement mechanism.

A solenoid launch latch 17 is mounted in a bore in the forward end of the block 11 and projects upwardly through a bore in the top plate 12 as shown in FIG. 7. An enlarged shoulder portion 19 secured to the solenoid launch latch 17 by a press fit retains the forward end of top plate 12 and block 11 in their assembled condition (see FIG. 4) by providing seats for the bolts 20. The top plate 12 and body 11 are further secured together by screws 21 or other suitable means.

The top plate 12, as best shown in FIG. 4, extends aft from the forward portion of the escape block to the lead block and miniature ball bearings in retainers 22 and 23 are pressed into bores through the top plate for reasons hereinafter described. A cylindrical housing 28 is mounted by a press fit into a bore in the aft end of the top plate 12 and is adapted to receive a primer of the firing train therein.

A pair of side rails 24 are secured to the recess portions 25 on each side of a top plate 12 by screws 26 or other suitable means and a plurality of locating pins 27 project from the top plate 12 to guide the side rails in place. The side rails 24 provide a guide way for the sliding weight 29 mounted on the top plate 12 and a plurality of elongated V-grooves 30 in the side rails 24 and the edges of the weight 29 provide a bearing surface for nylon ball bearings 31 in the guideway as shown in FIG. 8.

Figure 8:
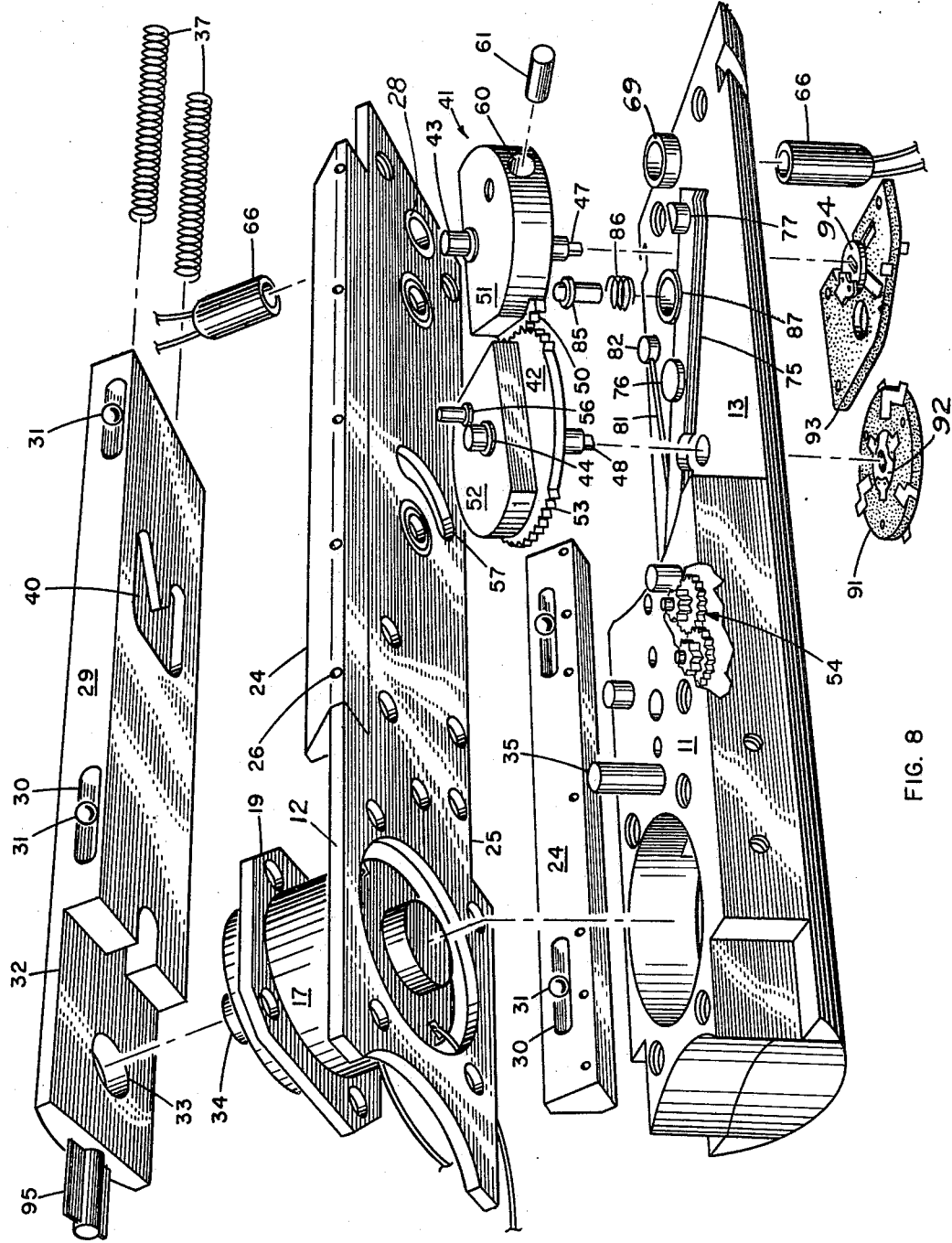
FIG. 8 is an exploded side view of the device without the header and lead blocks.

The sliding weight 29, commonly known in the art as a set-back or G weight, is under cut at its forward end portion 32 as shown in FIGS. 3, 5 and 8 whereby the forward end portion is adapted to ride over the top of the housing of the solenoid launch latch 17, an aperture 33 adjacent the forward end of the sliding weight receives the locking pin 34 of the solenoid launch latch 17. A stop pin 35 mounted on the block 11 adjacent the shoulder portion 19 provides an abutment means for the sliding weight 29 to absorb the shock of the returning weight and thus protect the solenoid launch latch 17 from unnecessary shocks.

As best shown in FIGURE 5, a pair of spaced apart guide pins 36 are mounted in the forward end of the stop block 58 and project forwardly into recessed openings at 39 in the weight 29. A pair of coil compression return springs 37 are mounted on the guide pins 36 and adapted to seat in said recessed openings and react between the forward end of the openings 39 and the forward end of the stop block 58 to restore the weight 29 to its forward position after the acceleration forces have diminished.

The weight 29 is further provided on its underneath side with a recessed cam slot 40 which can be of various configurations for reasons hereinafter set forth and is adapted to guide the movement of a pin projecting upwardly from one of the rotors.

A pair of rotors 41–42 rotatably mounted between the top plate 12 and bottom plate 13 are the portion of the present device that incorporated the Phillips concept to nullify the effect of lateral acceleration forces set forth in greater detail in the above mentioned application Ser. No. 582,607. The rotors 41 and 42 have shafts 43 and 44 respectively mounted in the ball bearing retainers 22 and 23 and enlarged shoulder portions 45 and 46 (see FIG. 9) adapted to engage the bottom plate 13 with the keyed shaft portions 47 and 48 projecting through plate 13 to actuate a pair of rotary switches.

In order to incorporate the teachings of Phillip's above mentioned invention the rotors 41 and 42, are geared together by suitable gear teeth 50 around a portion of their circumference and eccentrically weighted by weights 51 and 52 respectively (in FIG. 8). The weights 51 and 52 are positioned when the rotors are geared together, in their initial position prior to launching, with their centers of gravity on opposite sides of the longitudinal axis of the safety and arming device 10 whereby the longitudinal acceleration forces will rotate the rotors 41 and 42 in opposite directions when they are free to rotate and lateral or steering acceleration forces which tend to reduce the driving torque of one weight will increase the driving torque of the other weight by an equal amount thus substantially nullifying the effect of the lateral or steering acceleration forces (see FIG. 9). Also rotor 42 is geared by a segment 53 and gear train 54 to an escapement mechanism 55 and due to the reaction of the rotors described above the lateral acceleration forces will have little or no effect on the running rate of the escapement mechanism and gear train and thus will not appreciably affect the distance to arming of the missile. The escapement mechanism 55 may be of any conventional design commonly used in fuzes which are of the self-starting type and wherein the running rate is proportioned to the square root of the torque applied.

The rotor 42 has a pin 56 (see FIGS. 4 and 8) mounted eccentrically on its upper surface whereby the pin 56 projects through a curved aperture 57 in the top plate 12 and into the cam slot 40 wherein the cam slot 40 controls the rotary motion of the rotors 41 and 42.

As best shown in FIGURE 8, the rotor 41 has a bore 60 radially therein adapted to receive the detonator 61 of the explosive train. The rotor 41 and detonator 61 have an initial position wherein the detonator is rotated to one side of the longitudinal axis of the device 10 and is thus out of the explosive train until such time as the weight 29 and rotors 41 and 42 have been subject to sustained acceleration forces sufficient to arm the device.

Figure 17:
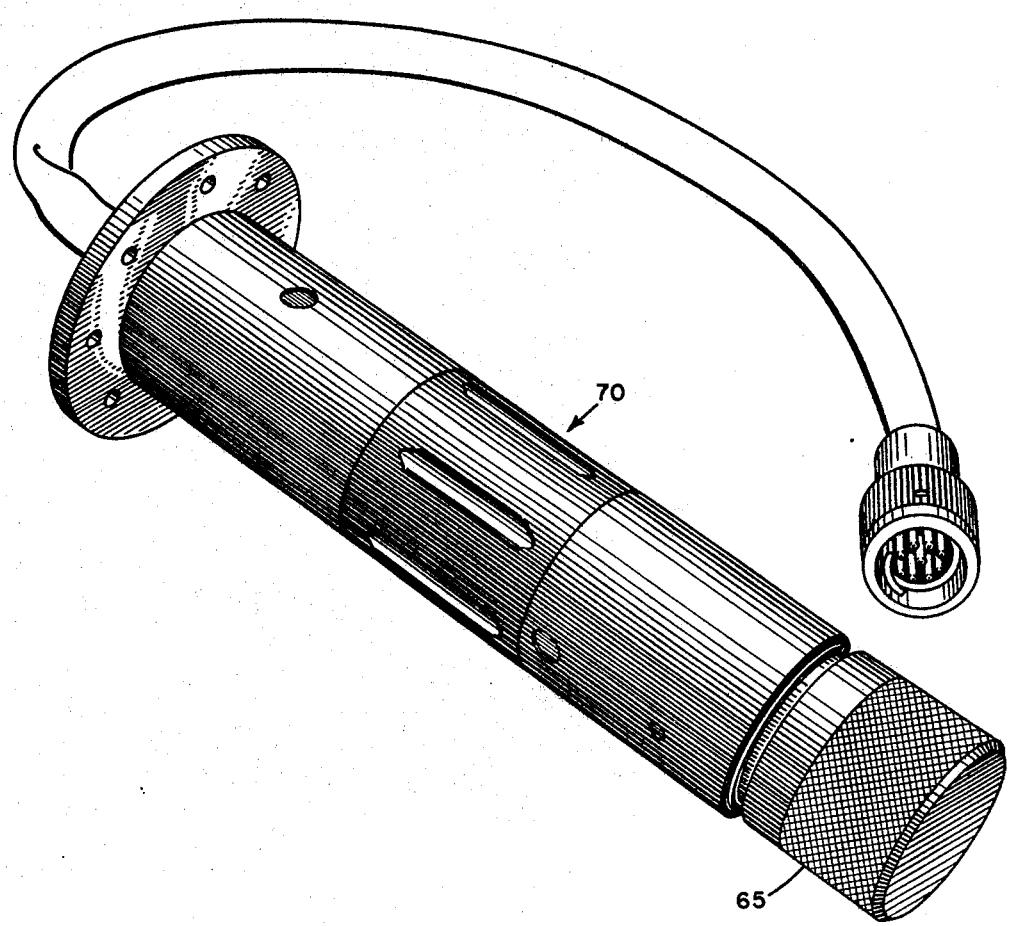
FIG. 17 is a perspective view of the complete housing for the safety and arming device and tetryl booster assembly.

Referring now to FIGS. 15 and 17 the safety and arming device 10 and tetryl booster 65 are housed in a cylindrical housing 70. The explosive train comprises a pair of primers 66 mounted in the housings 28 and 69 (see FIG. 8) of the top plate 12 and bottom plate 13 respectively whereby the primers are aligned with and normal to the detonator 61 when the rotor 41 has been rotated to the armed position. A short tetryl lead 71 housed in the lead block 15 completes the explosive train by connecting the detonator 61 with the tetryl booster 65.

Figure 9:
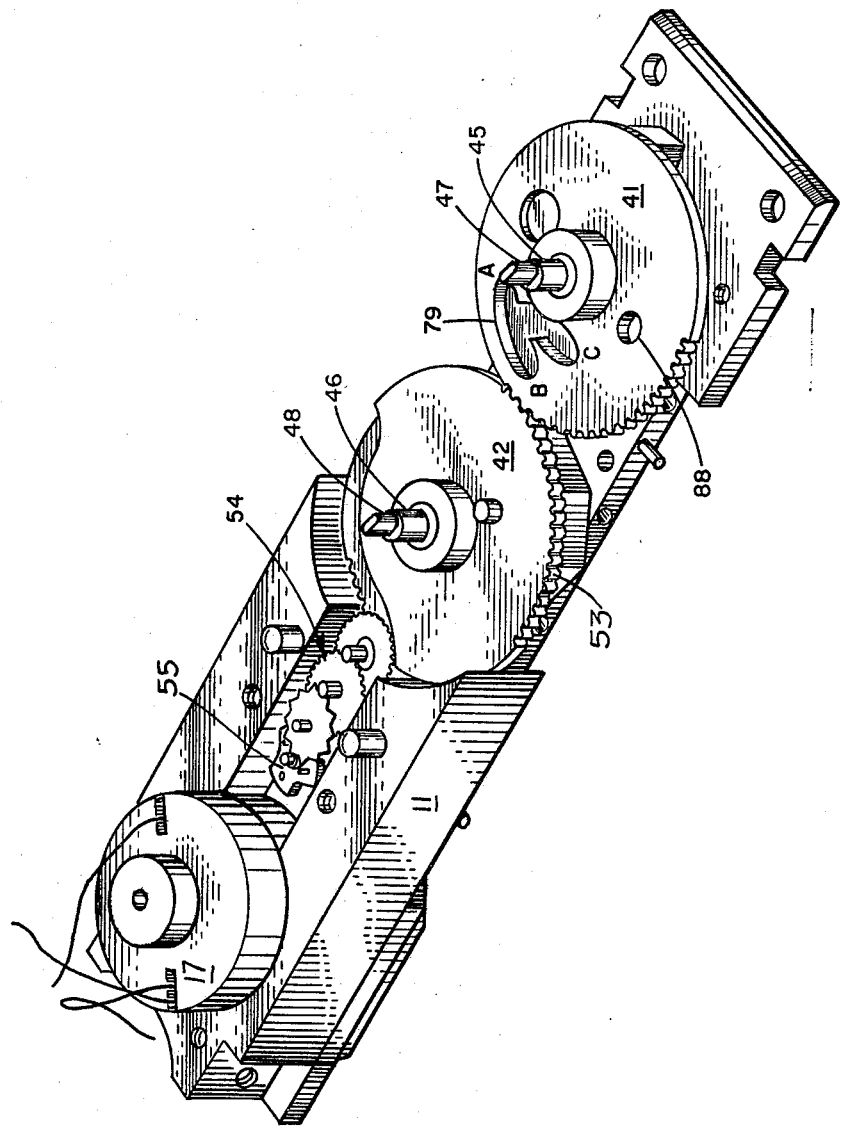
FIG. 9 is a bottom perspective view of the device with the bottom plate removed.
Figure 12:
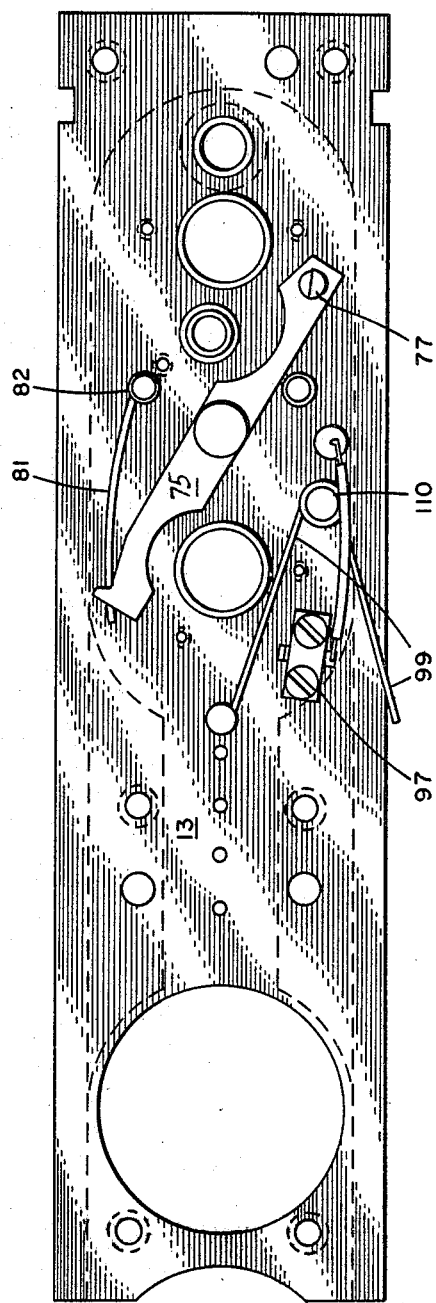
FIG. 12 is a top plan view of the bottom plate.

One of the safety features of the device is the lock lever 75 (see FIG. 8) pivotably mounted by a turnpost 76 on the bottom plate 13 and having a pin 77 in one end projecting upwardly to engage a cam slot 79 (see FIG. 9) in the bottom of the rotor 41. The pin 77 engages the cam slot 79 at point A as shown in FIG. 9 when the rotors 41 and 42 are in their initial safe position. If the rotors 41 and 42 rotate at a velocity allowed by the gear train and escapement mechanism the pin 77 will follow the cam surface to point C and allow the rotors to rotate to the arm position. If, however, there is a gear train failure and the rotors 41 and 42 are no longer under the control of the escapement mechanism and thus free to rotate very rapidly toward the armed position the pin will follow a path to point B which will stop the rotors short of the armed position. A spring member 81 is rigidly connected to a post 82 on the plate 13 as shown in FIGS. 8 and 12 with the outer end of the spring member engaging the forward end of the lock lever 75 thus urging the pin 77 to follow the normal path from point A to point C.

A detent spring-actuated pin 85 (see FIG. 8) is mounted in a cylindrical housing 87 on the bottom plate 13 and adapted to lock the rotor 41 in the armed position. A coil compression spring 86 reacts between the housing 87 and a shoulder on the pin 85 to urge the pin into an aperture 88 (FIG. 9) in the rotor 41 when the rotor has rotated to the armed position.

With reference to FIGS. 2, 3, 6, 8, 11, 12 and 16 the electrical components of the device 10 comprise a header 14 at the forward end of the device 10 to transmit the wires from the solenoid launch latch 17, rotary switches S–1, S–2, selector switch S–3 and an unshorter switch S–4 to an external power supply and control circuits. The rotary switch S–1 is a triple-pole, single-throw, single-deck switch and comprises a stator 91 mounted on the bottom shaft 48 (FIG. 8). The switch rotor 92 makes contact with the stator 91 (see FIG. 6) when the rotor 42 is rotated to the armed position whereby three external circuits are closed.

A second stator 93 is mounted on the aft end of the bottom plate 13 concentric with the rotor 41 and with the switch rotor 94 a single-pole, single-throw, single-deck switch S–2 is formed (see FIGURE 8). When the rotor 41 is rotated to the armed position the switch rotor 94 (see FIG. 6) makes contact with the stator 93 and switch S–2 is closed to complete the circuit to fire the primers provided the switch S–3 is closed and switch S–4 is open as hereinafter described.

The selector switch S–3 is mounted between the forward end of the weight 29 and the header block 14. A stator 95 (see FIGURE 8) is secured to the forward end of the weight 29 and projects toward the header block 14 making contact with two clip contacts 96 to make a firing circuit for the primers upon burnout of the missile motor (see FIGURE 2).

The unshorter switch S–4 provides a short circuit to ground through the primers 66 until the rotors 41 and 42 have completed their movement to the armed position and comprises a clip contact 97 (see FIG. 12) mounted on the bottom plate 13 by screws or other suitable means and a spring contact member 99 wound around a post 110 secured to the plate 13. This switch is normally shortened to ground by a pin 111 (see FIG. 7) on rotor 42 forcing the spring contact 99 into engagement with the clip contact 97 whenever the rotor 42 has been rotated to the unarmed position and as the rotor 42 rotates to the armed position the spring contact 99 moves away from the clip 97 and unshorts the primers 66.

Although various means of indicating when the rotors are in either a safe or armed position may be used, the preferred means disclosed is a stamped or painted S and A on the rotor 41 (see FIG. 3) which can be sighted through a window or aperture (not shown) in the housing 70. Another means would be a lever or cam mechanism actuated by one of the rotors 41 or 42 when the rotors rotate from the safe to the armed position.

In operation, before the missile is launched the sliding weight 29 is in its forward position and locked in this position by the locking pin 34 of the solenoid launch latch 17. The rotors 41 and 42 are locked in their safe position by the engagement of the pin 56 with the cam slot 40 in the initial position shown in FIG. 13a. When the rotors are in this position the electrical switches S–1, S–2, S–3 and S–4 are in their respective positions shown in FIG. 16 wherein switch S–1 is open, the firing circuit for the primers 66 is incomplete with the switch S–3 closed, switch S–2 open and the switch S–4 closed shorting the circuit to the primers in the event the switch S–2 is closed.

The safe initial position is indicated by the letter S on rotor 41 appearing in the window or peephole in the housing 70; also the tetryl detonator 61 housed in rotor 41 is out of line with the primers 66 and the tetryl lead 71.

Just prior to launching of the missile the solenoid launch latch 17 is actuated, freeing the set-back or sliding weight 29. Upon an acceleration force in excess of a predetermined amount in the longitudinal axial plane of the device 10, the weight 29 is driven aft compressing the return springs 37. When the sliding weight 29 has fully compressed the return springs 37, thus reaching its farthest aft position, the rotors 41 and 42 are completely unlocked from the control of the cam surface 40. As the rotors 41 and 42 start to rotate the safe indicator S moves out of sight in the peephole in the housing 70 and the lock lever pin 77 rides in the cam 79 (see FIGURE 9) and will follow the path from point A to point C if the rotor 41 rotates at the correct speed. If there is a gear train failure and the rotors 41 and 42 move very rapidly due to longitudinal acceleration forces acting on the eccentric weights, the lock lever pin 77 will not follow the normal arming path, but will instead, follow a path from point A to point B which will lock the rotor 41 short of the armed position.

The gear train 54 and balanced escapement mechanism 55 will meter the power from the eccentrically weighted rotors 41 and 42 at an integrating rate corresponding to the acceleration forces to which the missile is subjected as the rotors 41 and 42 rotate through an angle predetermined by the arc of the gear segment 53. At this point the missile will have reached a minimum safe distance from the launching position. The rotors 41 and 42 now disengage from the gear train and snap through the remaining arc to align the detonator 61 up with the tetryl lead 71 and position it between the two primers 66. This snap movement also better enables the rotary switches S–1 and S–2 to close and make three circuits external to the device 10 and the arming circuit is in condition to complete the circuit to the primers 66.

As noted above the relationship of the rotor pin 56 and the configuration of the cam slot 40 determines the commit point and the position of arming as the rotors 41 and 42 rotate. FIGS. 13a through 13f and FIGS. 14a through 14g disclose two preferred embodiments of the cam slot and the relationship of the pin 56 therein.

Figure 13A:
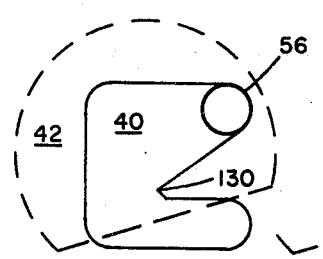
FIGS. 13a–13f are a schematic sketch illustrating one embodiment of the setback weight and rotor cam action.
Figure 13B:
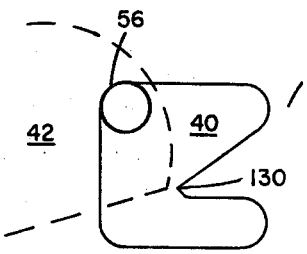
Figure 13C:
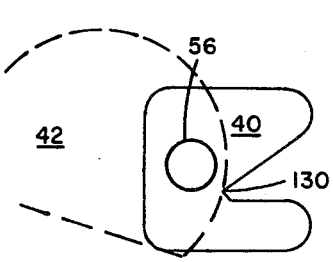
Figure 13D:
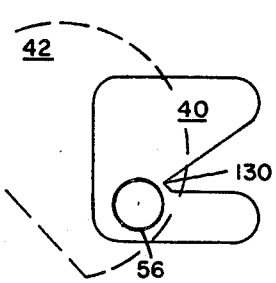

In the initial position shown in FIG. 13a the sliding weight 29 is in its forward locked position and the rotors 41 and 42 are in the safe position, with the pin 56 located in the upper right hand corner. In FIG. 13b the launch latch pin has been withdrawn and the sliding weight has moved to its fartherest aft position under the action of acceleration forces. In FIG. 13c the rotors 41 and 42 are rotating under the control of the escapement mechanism and gear train toward the armed position due to the forces of acceleration acting on the eccentrically weighted rotors. The pin 56 has not rotated past the commit point 130, in this position, and the pin 56 would rotate the rotors 41 and 42 back to their initial safe position in the event the rocket motor should burn out prior to the time that the rotors have moved through their complete initial integrated distance and the sliding weight 29 has returned to its forward position by the action of the springs 37. In FIG. 13d the rotors have rotated sufficiently to allow the pin 56 to pass the commit point 130 and are no longer under the influence of the escapement mechanism, and should the sliding weight move forward due to the decrease of acceleration forces the pin 56 would be pushed by the cam surface whereby the rotors 41 and 42 would be rotated into the armed position.

Figure 13E:
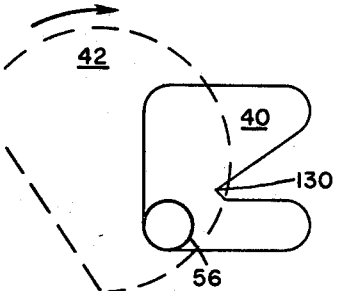
Figure 13F:
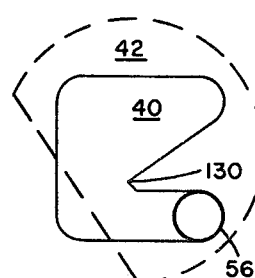

In FIG. 13e the rotors 41 and 42 are at the point where they have rotated beyond the end of the gear train and are free acting whereby the pin 56 and cam slot 40 have now allowed the rotors to rotate to the fully armed position and should the missile intercept the target the booster charge would be exploded. FIG. 13f discloses the rotors 41 and 42 at their completely armed position and the pin 56 in the same position that it was in FIG. 13e, however, due to rocket motor burnout and cessation of the acceleration forces the sliding weight 29 has now moved back to its initial forward position whereby the pin 56 is locked in the lower right hand corner as shown in FIG. 13f of the cam slot.

Figure 14A:
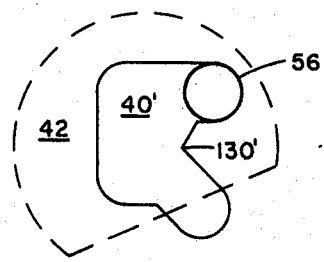
FIGS. 14a–14g are schematic sketches of a second embodiment of the setback weight and rotor cam action.
Figure 14B:
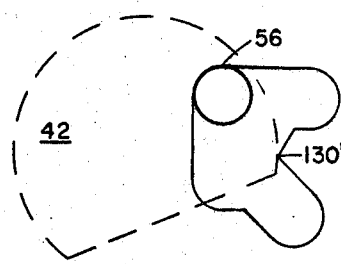

With reference to FIGS. 14a through 14g, the relationship of the pin 67 and the cam slot 40′ are as follows: In FIG. 14a the sliding weight 29 is in its forward position and the rotors 41 and 42 are in their initial safe position. In FIG. 14b the weight 29 has moved to its furthest aft position after having been released by the launch latch pin and the missile has been launched. The rotor 41 and 42 are still in their initial safe position.

Figure 14C:
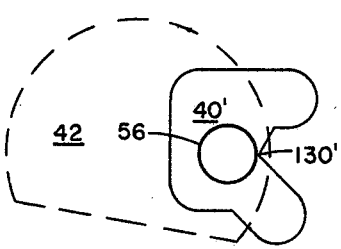

In FIG. 14c the rotors have commenced to rotate to the commit point 130′ which is reached when the minimum force required to arm the device is of sufficient duration to cause the rotors to rotate to the position shown in FIG. 14c. Any force of less duration would only partially rotate the rotors and they would return to the safe position at the cessation of such a force due to the cam action of the cam slot 40.

Figure 14D:
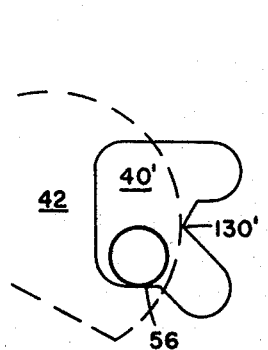

In FIG. 14d the rotors 41 and 42 have rotated beyond the end of the gear train and the commit point 13d whereby the escapement mechanism is no longer in control of the rotors rotation.

Figure 14E:
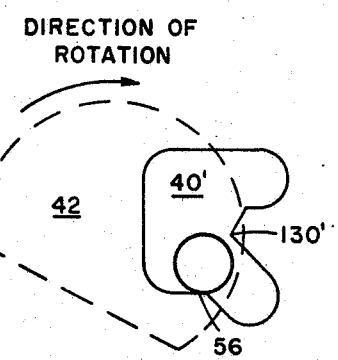

In FIG. 14e the rocket motor burnout and cessation of acceleration forces has occured, the sliding weight 29 has started to move forward and the rotors 41 and 42 have commenced their rotation without the control of the escapement mechanism.

Figure 14F:
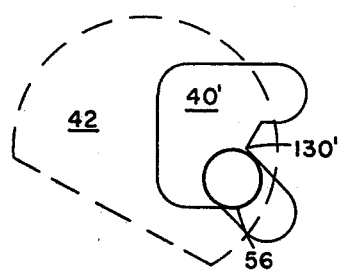
Figure 14G:
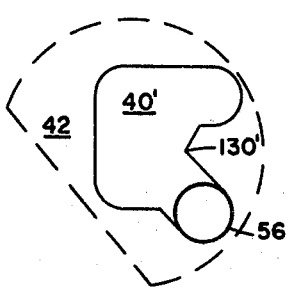
Figure 16:
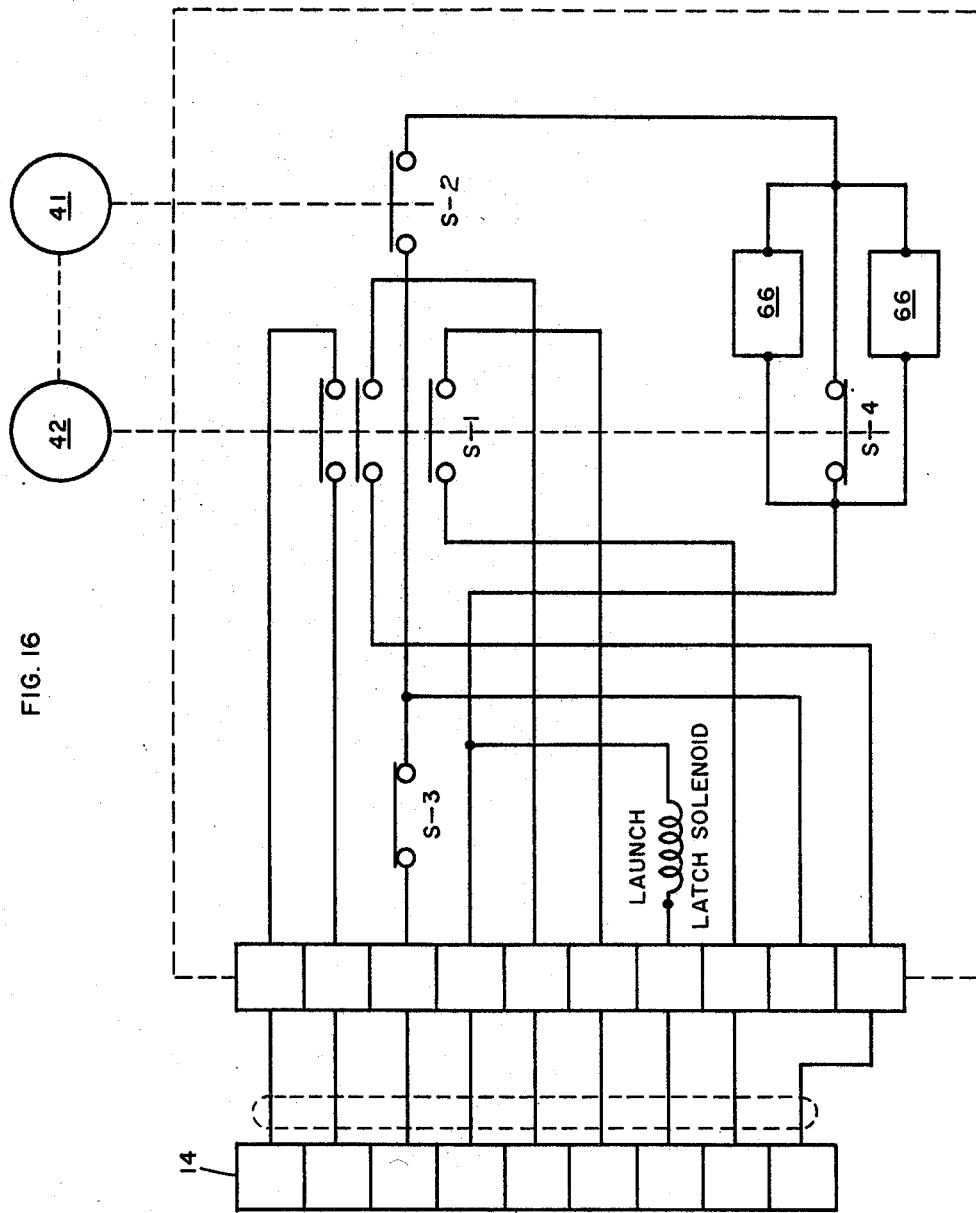
FIG. 16 is a schematic sketch of the electrical circuit of the device.

In FIG. 14f the G weight is still in motion toward its foremost position and the pin 56 has rotated to a point substantially equal to its position at the initial cam action, however, in this species of the cam unlike the cam action shown in FIG. 13f, the pin 56 and cam slot 40′ have not allowed the rotors to rotate to the complete arm position until the sliding weight 29 has returned to its initial forward position after rocket burnout. In FIG. 14g the G weight or sliding weight 29 has returned to its foremost position and the rotors are now rotated to the armed position equivalent to the one shown in FIG. 13f. The detonator in rotor 41 is now in line between the primers in the lead block and in a position in line with the lead.

Obviously many modifications and variations of the present invention are possible in the light of the above teachings.

What is claimed is:

1. An inertia operated safety and arming device for a missile having longitudinal and lateral accelerations due to steering of the missile in flight comprising an escape block having forward and aft ends and whose longitudinal axis passes through the forward and aft ends thereof, a pair of spaced apart plates rigidly mounted at the aft end of said escape block and projecting outwardly therefrom, a header block mounted on the forward end of said escape block and plates in their assembled condition, a lead block mounted on the free ends of said plates projecting outwardly from said escape block, a setback weight having a forward end proximate to the forward end of said escape block and adapted to reciprocate longitudinally parallel to the longitudinal axis of said escape block in a guide way on one of said plates, apertures in the forward end of said setback weight and said one plate, a solenoid mounted in said escape block including a locking pin adapted to reciprocate in said apertures whereby said setback weight is locked in its forward position, a pair of eccentrically weighted geared together rotors pivotably mounted between said plates adjacent said escape block and responsive to longitudinal acceleration forces and a control means connecting said setback weight and one of said rotors whereby rotary motion of said rotors is controlled by the sliding movement of said setback weight.

2. The inertia operated safety and arming device of claim 1 in which said control means comprises, a cam slot in said setback weight, a curved aperture in one of said plates and a pin mounted on one of said rotors projecting through said aperture and into engagement with said cam slot whereby longitudinal acceleration forces of a predetermined value force said setback weight rearwardly in said guideway freeing the rotors to rotate under the influence of said longitudinal acceleration forces.

3. The inertia operated safety and arming device of claim 1 in which a balanced escapement mechanism is mounted in said escape block, a gear train operably connects said escapement mechanism and one of said rotors whereby the power developed by said rotors is metered at an integrating rate corresponding to the longitudinal acceleration forces to which the missile is subjected.

4. The inertia operated safety and arming device of claim 1 in which an explosive train therein comprises, a primer mounted in each of said plates adjacent one of said rotors and normal thereto, a detonator housed in said one rotor and rotatable from an unarmed position to an armed position in line with said primers, a lead housed in said lead block, a booster mounted adjacent said lead whereby detonation of said explosive train consist of firing said primers out their ends on either side of said rotor and at right angles to said detonator, said detonator in turn initiates said lead firing the center of said booster.

5. The inertia operated safety and arming device of claim 1 in which a stop block is mounted on said lead block in line with said setback weight, a pair of spaced apart guide pins mounted on said stop block and projecting toward said setback weight, a pair of coil compression return springs mounted on said guide pins and seated in said openings whereby said return springs restore said setback weight to its forward position after said longitudinal acceleration of the missile has diminished.

References Cited
UNITED STATES PATENTS

| | | | |
|---|---|---|---|
| 2,801,589 | 8/1957 | Meek et al. | 102—78 |
| 2,486,362 | 10/1949 | O'Brien | 102—70.2 |
| 2,827,850 | 3/1958 | Muzzey | 102—78 |
| 2,789,506 | 4/1957 | Filbert | 102—70.2 |

OTHER REFERENCES

Article entitled "The Measurement of Accelerations," which appears in the March 1930 issue of Aircraft Engineering, written by H. E. Wimperis, pp. 53 and 54 are pertinent.

VERLIN R. PENDEGRASS, Primary Examiner

U.S. Cl. X.R.

102—78